United States Patent [19]

Douziech et al.

[11] Patent Number: 4,553,156

[45] Date of Patent: Nov. 12, 1985

[54] CIRCUIT AND PROCESS FOR CHROMINANCE DECODING WITH ANALOG OR DIGITAL DELAY LINE IN A TELEVISION SYSTEM OF A PAL OR SECAM TYPE

[75] Inventors: Patrick Douziech, Rives sur Fures; Michel Imbert, Seyssin, both of France

[73] Assignee: Thomson-CSF, Paris, France

[21] Appl. No.: 559,607

[22] Filed: Dec. 8, 1983

[30] Foreign Application Priority Data

Dec. 10, 1982 [FR] France ............................ 82 20775

[51] Int. Cl.$^4$ .................. H04N 9/50; H04N 9/47; H04N 9/40

[52] U.S. Cl. .................................. 358/24; 358/18; 358/14

[58] Field of Search .................. 358/24, 18, 14, 23

[56] References Cited

PUBLICATIONS

Radio Mentor Electronic, vol. 46, No. 7/8, Jul./Aug. 1980, pp. 212–213, Munich, Germany, "Digitale Signalverarbeitung im Farbfernseher".

Primary Examiner—John C. Martin
Assistant Examiner—Michael P. Dunnam
Attorney, Agent, or Firm—Pollock, VandeSande & Priddy

[57] ABSTRACT

The present invention provides a matching circuit for connecting a chrominance decoding integrated circuit normally connected by terminals to a conventional analog delay line so as to make it compatible with a digital delay line. This matching circuit comprises a switch connecting alternately each of the outputs of the integrated circuit to an analog-digital convertor connected to a digital delay line, to a digital-analog convertor, then to a switch routing the signal alternately to each of the two summators whose other inputs receive directly the output of the integrated circuit. The summators supply then respectively the chrominance signals R-Y and B-Y.

5 Claims, 8 Drawing Figures

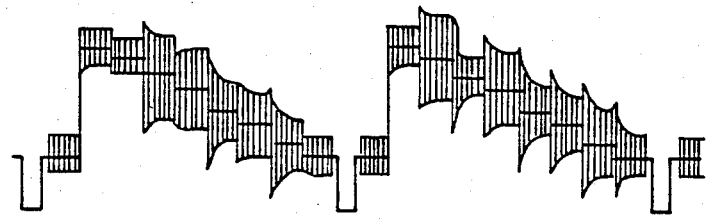
Fig.1
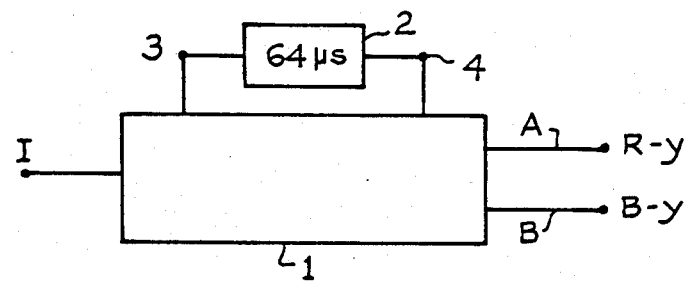
Fig.2
PRIOR ART
Fig.3
PRIOR ART
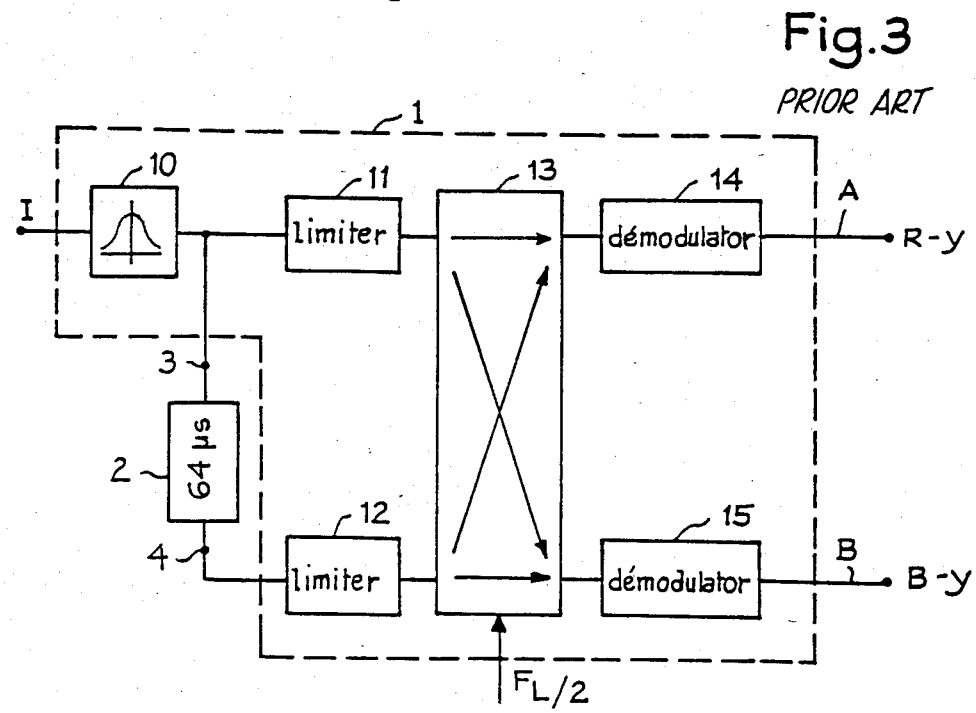

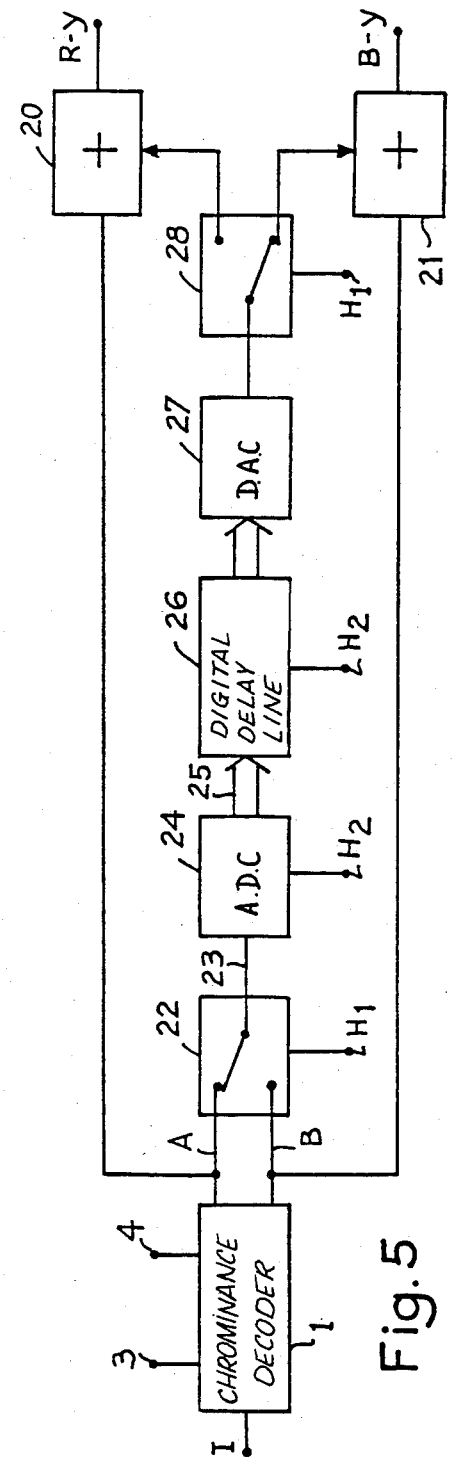

CIRCUIT AND PROCESS FOR CHROMINANCE DECODING WITH ANALOG OR DIGITAL DELAY LINE IN A TELEVISION SYSTEM OF A PAL OR SECAM TYPE

BACKGROUND OF THE INVENTION

1. Field of the Invention

The present invention relates to the field of color television circuits and, more particularly, chrominance decoding circuits. It applies more especially to the reception of televised broadcasts transmitted in accordance with the SECAM or PAL standards.

2. Description of the Prior Art

By way of reminder, FIG. 1 shows the structure of two successive lines transmitted in a colour television system of the SECAM type in the case where the transmitter supplies the image of a pattern of coloured vertical bars, the left hand bar being white and that of the right being black. For each color the superimmposition can be observed of the DC signal carrying luminance information and an AC signal whose modulation carries chrominance information.

In the PAL and SECAM systems, in order to have all the chrominance information relative to a displayed line, partial information present on two successive transmitted lines must be simultaneously available.

Thus, a chrominance decoding circuit is very schematically shown in FIG. 2. From input input signals I corresponding to the composite video signal, an integrated circuit supplies at its output channels A and B the chrominance signals R−Y and B−Y with the integrated circuit is necessarily associated a delay line 2, the value of the delay corresponding to the duration of the line, namely 64 microseconds in the case of transmission with 625 lines per image. Thus, it is possible to combine at a certain level of the integrated circuit 1 the signals relative to a transmitted line with those of the previously transmitted line, the result of this combination providing the chrominance signals R−Y and B−Y relative to a line to be displayed. Although they are not shown in the figure, certain discrete elements are generally associated with the integrated circuit 1, essentially high value capacitors useful for the filtering circuits, for example at the level of the bell filter of a SECAM decoder.

At the present time, the delay line 2 is generally an ultrasonic delay line.

One disadvantage of such a delay line is that it is a space wasting component. On the other hand, the provision of an ultrasonic delay line in a SECAM decoder is likely to introduce a certain diaphoty, that is to say a mixture of information contained in two successive lines. In the case of a PAL decoder, it is neccessary to associate with an ultrasonic delay line at least two adjusting means, which increases the manufacturing cost.

Thus, it has been suggested to replace the ultrasonic delay line by a digital delay line, the space consuming, diaphoty and adjusting disadvantageous then being overcome. However, given the difference of the physical phenomena brought into play in an ultrasonic delay line and in a digital delay line, these lines must not be placed in the same stage of the integrated decoding circuit 1; this, more especially because of the fact that an ultrasonic delay line acts on high frequency signals, that is to easy that the chrominance signals must be fed into this delay line before demodulation thereof, whereas a digital delay line acts preferably on lower frequency signals and so the demodulated chrominance signals are fed therein. Consequently in order to use a digital delay line rather than an ultrasonic delay line, it has been generally thought necessary to modify completely the architecture of the integrated circuit 1. Thus the cost of going over from an integrated circuit with ultrasonic delay lines to an integrated circuit with digital delay lines is increased since the whole of the integrated circuit must be redesigned.

At the present time, ultrasonic delay lines are still generally less expensive than digital delay lines. But, with the development of technologies this price ratio could in the near future be reversed. Thus, the present invention provides a matching means for using a conventional integrated circuit 1, normally associated with an ultrasonic delay line, for using this circuit with a digital delay line without any modification and, more especially, without it being necessary to provide additional access terminals, which, as is well known in the technique, from an important factor in increasing the cost of an integrated circuit. Thus, a television receiver constructor, normally using conventional integrated circuits associated with ultrasonic delay lines may, as soon as the ratio of the prices between the digital delay lines and ultrasonic delay lines is reversed, use in accordance with the invention the same conventional integrated circuit with a digital delay line. He may also, if he desires to construct high quality apparatus with digital delay line, even at the price of a cost increase, adapt a digital delay line without any difficulty by keeping the same conventional integrated circuit as the main element of the decoder.

SUMMARY OF THE INVENTION

To attain these objects, the present invention provides a chrominance decoding circuit with digital delay line for systems of the PAL and SECAM type comprising a conventional chrominance decoding circuit itself comprising an integrated circuit having two terminals normally connected to a conventional ultrasonic analog delay line for example a volume wave line, and two output terminals, normally providing, when the conventional delay line is connected, the chrominance signals R−Y and B−Y. In the circuit of the invention, the ultrasonic delay line is not used and the corresponding terminals are not connected. On the other hand, this decoding circuit comprises a matching circuit connected to the output terminals of the conventional circuit, this matching circuit itself comprising: a first channel connecting the first output terminal to a first input of a first summator, a second channel connecting the second output terminal to a first input of a second summator; and a third channel comprising successively: a switch with two inputs and one output in which each input is connected alternately to each of the output terminals at a frequency H1, an analog-digital converter activated at a frequency H2, a digital delay line activated at a frequency H2, a digital-analog convertor and a switch with one input and two outputs, each output being connected to a second input of the first and second summators at frequency H1. Thus, the summators supply the design at B−Y and R−Y signals.

The digital delay line may be formed by a shift register with n bits in parallel and p cells, the number p being such that p/H2 is equal to the design delay. In the case of the PAL system, the sub-carrier frequency will be preferably chosen for H2 and the sub-carrier half-frequency for H1. In the case of the SECAM system, a frequency equal to or close to one of the two sub-carrier frequences will be chosen for H2 and the line half-frequency for H1.

BRIEF DESCRIPTION OF THE DRAWINGS

These objects, features, and advantages as well as others of the present invention will be set forth in greater detail in the following description of one particular embodiment, with reference to the accompanying figures in which:

FIG. 1, previously described, shows very schematically the trend of the composite video signal for two successive television lines, FIG. 2, described previously, shows very schematically the design of a chrominance decoder in a PAL or SECAM system, FIG. 3 shows in block form a conventional chrominance decoding circuit according to the SECAM system, FIGS. 4A to 4D show symbolically the succession of signals received and supplied by a chrominance decoding circuit in different cases, and FIG. 5 shows in block form a matching circuit in accordance with the present invention.

By way of reminder and to give a better understanding of the present invention, FIG. 3 shows in block form the the main components of a conventional chrominance decoding circuit adapted to the SECAM system. We find again, designated by the broken line frame, the integrated circuit 1 of FIG. 2 to which a delay line 2 is connected through terminals 3 and 4. The circuit receives a composite video signal I and filters from it the chrominance sub-carriers by a bell filter 10 whose output is applied to limiters 11 and 12, on the one hand directly and, on the other hand, through the delay line 2. Each limiter has its output connected to an input of a switching circuit 13 which connects each of the limiters alternately to each of two demodulators 14 and 15 under the control of a square wave signal at the line half frequency FL/2. The output of demodulator 14 on channel A will then be the chrominance signal R—Y (or B—Y) and a signal at the output of demodulator 15 on a channel B will be the chrominance signal B—Y (or R—Y). In fact, in the SECAM system, the chrominance sub-carriers are frequency modulated and the demodulators will be frequency discrimators. A more detailed description of the circuit FIG. 3 will be found in any conventional reference work on colour television receivers.

As shown in FIG. 4A, if we consider the successive phases of the signal I during each line duration, we have for a first line duration, a signal I1 corresponding to R—Y information, then a signal I2 corresponding to B—Y information and so on. The normal outputs of the circuit of FIG. 3 using a delay line are the outputs A1 and B1 shown in FIG. 4B formed of a succession of R—Y signals and a succession of B—Y signals respectively.

If the delay line 2 is disconnected or rather if it is not connected to terminals 3 and 4, there will be obtained on channel A and on channel B respectively the signals A2 and B2 shown in FIG. 4C, i.e. during the duration of a line a R—Y signal followed by a blank, followed by a R—Y signal followed by a blank and so on in channel A2, then a blank followed by a B—Y signal, followed by a blank, followed by a B—Y signal and so on in channel B2.

So as not to over load the present description, the structure of a chrominance decoding circuit adapted to the PAL system will not be described in detail, but it can be shown that with such a circuit, if the delay line is omitted, we find at the output in channel A a signal A3 comprising successively R—Y information to which is added a constant a, then R—Y information from which this constant a is subtracted, i.e. a succession R—+a, R—Y—a, R—Y+a, R—Y—a and so on. Similarly in channel B we find a signal B3 formed of a succession of B—Y information plus a constant b and B—Y less a constant b, i.e. successively information B—Y+b, B—Y—b, B—Y+b, b—Y—b and so on. The constants a and b are mainly due to the diaphoty between the modulators and to the phase errors of the transmission.

The purpose of the matching circuit of the present invention is, while receiving signals such as A2 and B2 or A3 and B3, to provide again at the output signals such as A1 and B1.

FIG. 5 shows one example of a matching circuit in accordance with the present invention in schematical form. There is shown therein the integrated circuit 1 receiving the composite video signal I and whose terminals 3 and 4 are not connected. Channels A and B are connected respectively to first input of adders 20 and 21. Channels A and B are also connected to each of the inputs of a switch 22 connecting alternately each of the inputs to an output 23 to an analog-digital convertor 24 supplying over a bus 25 a digital delay line 26 formed for example by a shift register with several bits in parallel, each of the input cells receiving one of the output bits from the analog-digital convertor. The output of the digital delay line 26 is fed through a digital-analog convertor 27 through the input of a switch 28 with two outputs, this switch directing the input signal alternately to each of the outputs.

Each of the outputs of switch 28 is directed to the second input of summators 20 and 21.

The analog-digital convertor 24 and the delay line 26 receive a clock frequency H2, for example the frequency of the color sub-carrier in the bell system, this same frequency in a dual standard PAL-SECAM system and a fixed selected frequency, for example close to one of the frequencies of the sub-carriers in a SECAM system. This frequency H2 is related to the number of cells of the shift register 26 so that the desired shift is obtained, mainly for example 64 microseconds in a conventional 625 lines television system. It should be recalled that the frequency of the color sub-carrier in the PAL system is 4.43 MHz and that it will therefore be necessary to provide a register with 284 cells of the "fifo" type (first in, first out), this register possibly comprising six rows of cells in parallel in the case where an accuracy of six bits is considered sufficient.

Switches 22 and 28 are activated at a frequency H1. In this case of the PAL system where, as shown in FIG. 4D, there exists at all times a signal present and having to be processed in each of the channels A and B, it is advisable to choose a high frequency as routing frequency. This frequency may for example be half the frequency of the sub-carrier (2.215 MHz). In the case of the SECAM system, as rapid a switching speed is pointless since the signals do not exist simultaneously on each of channels A and B. It will then be sufficient for the switching to be effected at the line half frequency (of the order of 7.8 KHz) although a higher switching frequency may however be adopted if desired.

It can then be seen that with the device of the present invention, information present on each of channels A and B and spaced apart by the duration of the line are added in each of summators 20 and 21. Thus, in the case of the PAL and SCAM systems, a signal will be obtained directly proportional to R−Y and to B−Y. This is clear in the case of the SECAM system and it can be seen that in the case of the PAL system, the additive and subtractive constants cancel out.

This whole of the circuits shown at the output of channels A and B may be integrated in a single integrated circuit of average complexity and it is to be hoped that, in the near future, such a circuit reaches a cost less than that of an ultrasonic delay line.

We claim:

1. A process for manufacturing a chrominance decoding circuit, comprising the following steps;
   using a conventional chrominance decoding circuit formed more especially from an integrated circuit whose two terminals are intended to be connected to a conventional analog delay line and whose two output terminals are intended to supply the chrominance signals B−Y and R−Y,
   not connecting the analog delay line,
   connecting the outputs of the circuit to a digital-delay line matching circuit comprising:
      a first channel connecting the first output terminal to a first input of a first summator,
      a second channel connecting the second output terminal to a first input of a second summator,
      a third channel comprising successively:
      a switch with two inputs and one output in which each input is connected alternately to each of the outputs of the integrated circuit, at a frequency H1,
      an analog-digital convertor actuated at a frequency H2,
      a digital delay line actuated at the frequency H2,
      a digital-analog convertor,
      a switch with one input and two outputs, each output being connected to a second input of the first and second summators at frequency H1, the outputs of the summators supplying signals B−Y and R−Y.

2. A chrominance decoding circuit with digital delay line for a system of the PAL or SECAM type comprising a conventional chrominance decoding circuit itself comprising an integrated circuit having two terminals normally connected to a conventional analog delay line, for example a volume wave line, and two output terminals normally supplying, when the conventional delay line is connected, the chrominance signals R−Y and B−Y, wherein the delay line is not used and the corresponding terminals are not connected, this decoding circuit further comprising a matching circuit connected to the output terminals of the conventional circuit, this matching circuit comprising:
   a first channel connecting the first output terminal to a first input of a first summator,
   a second channel connecting the second output terminal to a first input of a second summator,
   a third channel comprising successively:
   a switch with two inputs and one output in which each input is connected alternately to each of the outputs of the conventional circuit, at a frequency H1,
   an analog-digital convertor actuated at a frequency H2,
   a digital delay line actuated at frequency H2,
   a digital-analog convertor,
   a switch with one input and two outputs, each output being connected to a second input of the first and second summators, at frequency H1, the outputs of the summator supplying the signals B−Y and R−Y.

3. The chrominance decoding circuit as claimed in claim 2, wherein said digital delay line is a shift register with n parallel bits and with a number of cells p such that p/H2 is equal to the desired delay.

4. The chrominance decoding circuit as claimed in claim 2, adapted to the PAL system, wherein said frequency H2 is the frequency of the color sub-carrier and the frequency H1 is equal to half this frequency.

5. The chrominance decoding circuit as claimed in claim 2, adapted to the SECAM system, wherein said frequency H2 is a frequency close to the color sub-carrier frequencies and the frequency H1 is equal to the line half frequency.

* * * * *